(12) United States Patent
Yoshikawa et al.

(10) Patent No.: US 8,431,633 B2
(45) Date of Patent: Apr. 30, 2013

(54) SILICA PARTICLES, MANUFACTURING METHOD THEREOF AND RESIN PARTICLES

(75) Inventors: Hideaki Yoshikawa, Kanagawa (JP); Yuka Zenitani, Kanagawa (JP); Hiroyoshi Okuno, Kanagawa (JP); Shinichiro Kawashima, Kanagawa (JP); Yasuo Kadokura, Kanagawa (JP); Shunsuke Nozaki, Kanagawa (JP); Sakae Takeuchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/340,036

(22) Filed: Dec. 29, 2011

(65) Prior Publication Data

US 2013/0012657 A1    Jan. 10, 2013

(51) Int. Cl.
*B32B 27/14*    (2006.01)

(52) U.S. Cl.
USPC ........... 523/204; 423/335; 423/338; 423/339; 428/403; 428/404

(58) Field of Classification Search ........................ None
See application file for complete search history.

(56) References Cited

U.S. PATENT DOCUMENTS

| | | | |
|---|---|---|---|
| 5,221,497 A | 6/1993 | Watanabe et al. | |
| 5,597,512 A | 1/1997 | Watanabe et al. | |
| 6,015,656 A * | 1/2000 | Nagami | 430/531 |
| 2008/0086951 A1 | 4/2008 | Wakamiya et al. | |
| 2011/0209413 A1 | 9/2011 | Nishida et al. | |
| 2012/0231381 A1* | 9/2012 | Kitajima et al. | 430/105 |
| 2012/0237864 A1* | 9/2012 | Saito et al. | 430/105 |

FOREIGN PATENT DOCUMENTS

| | | |
|---|---|---|
| JP | A 01-317115 | 12/1989 |
| JP | A 04-187512 | 7/1992 |
| JP | A 07-118008 | 5/1995 |
| JP | A 11-060232 | 3/1999 |
| JP | A 2001-150334 | 6/2001 |
| JP | A 2002-038049 | 2/2002 |
| JP | A 2003-133267 | 5/2003 |
| JP | A 2004-035293 | 2/2004 |
| JP | A 2004-203638 | 7/2004 |
| JP | A 2008-169102 | 7/2008 |
| JP | A 2009-078935 | 4/2009 |
| JP | A 2009-137791 | 6/2009 |
| JP | A 2009-149493 | 7/2009 |
| JP | A 2009-161371 | 7/2009 |

* cited by examiner

*Primary Examiner* — Marc Zimmer
(74) *Attorney, Agent, or Firm* — Oliff & Berridge, PLC

(57) ABSTRACT

Disclosed are silica particles having a volume average particle size of from about 100 nm to about 500 nm, an average circularity degree of from about 0.5 to about 0.85, and an average value of the ratios of circle equivalent diameters Da of the silica particles obtained by a flat image analysis to maximum heights H of the silica particles obtained by a stereoscopic image analysis of more than 1.5 and less than 1.9.

11 Claims, No Drawings

SILICA PARTICLES, MANUFACTURING METHOD THEREOF AND RESIN PARTICLES

CROSS-REFERENCE TO RELATED APPLICATIONS

This application is based on and claims priority under 35 USC 119 from Japanese Patent Application No. 2011-150121 filed Jul. 6, 2011.

BACKGROUND

1. Technical Field

The present invention relates to silica particles, a manufacturing method thereof and resin particles having the silica particles.

2. Related Art

Silica particles are used as an additive component or a main component of toners, cosmetics, rubber, abrading agents or the like, for example, to enhance the strength of resin, to enhance the flowability of powder, or to suppress packing. It is considered that properties of the silica particles tend to depend on the shapes of the silica particles, and in this regard, silica particles of various shapes have been proposed.

SUMMARY

According to an aspect of the invention, there are provided silica particles having a volume average particle size of from about 100 nm to about 500 nm, an average circularity degree of from about 0.5 to about 0.85, and an average value of the ratios of circle equivalent diameters Da of the silica particles obtained by a flat image analysis to maximum heights H of the silica particles obtained by a stereoscopic image analysis of more than 1.5 and less than 1.9.

DETAILED DESCRIPTION

Silica Particles

Silica particles according to an exemplary embodiment of the invention have a volume average particle size of from 100 nm to 500 nm (or from about 100 nm to about 500 nm), an average circularity degree of from 0.5 to 0.85 (or from about 0.5 to about 0.85), and an average value of the ratios of circle equivalent diameters Da of the silica particles obtained by a flat image analysis to maximum heights H of the silica particles obtained by a stereoscopic image analysis of more than 1.5 and less than 1.9.

The circularity degree represents the sphericality of the silica particle, and when the circularity degree is 1, the particle is a true sphere. The silica particles according to the present exemplary embodiment have the shapes of primary particles that have the average circularity degree of 0.85 or less and have large numbers of concavities and convexities compared with the true sphere. Hereinafter, the shape in which the circularity degree is 0.85 or less is referred to as a "irregular shape", and the shape in which the circularity degree exceeds 0.85 is referred to as a "spherical shape". That is, the shapes of the silica particles according to the present exemplary embodiment are of the irregular shapes.

By configuring the silica particles according to the present exemplary embodiment as mentioned above, the silica particles maintain the flowability of an attachment target. Although not clear, the following may be considered as the reason.

Hereinafter, when the term "primary particles" is simply used, it indicates the primary particles of the silica particles.

The fact that the average value of the ratios (Da/H) of the circle equivalent diameters Da of the silica particles obtained by the flat image analysis to the maximum heights H of the silica particles obtained by the stereoscopic image analysis exceeds 1.5 and is less than 1.9 means that the silica particles are flat particles having specific thicknesses. A specific measurement method of Da and H will be described later, and Da and H will be hereinafter described.

When the flat particles in addition to the silica material are located on a flat surface, the particles are generally located on the flat surface in a state where it is difficult for the particles to oscillate. Even when an outer surface in which a cover area that covers the flat surface is small, such as a sharp angle, an end part of a side or the like, is in contact with the flat surface and is located on the flat surface, if a force is applied to the particle, the particle is turned over or inclined, so that the particle tends to be located on the flat surface in a state of not being turned over even though the force is applied thereto. In other words, among the outer surfaces of the particle, a surface in which the cover area of the flat surface is large or a surface in which the area that is in contact with the flat surface is large tends to be in contact with the flat surface and be located on the flat surface.

Here, the maximum height H of the silica particle obtained by the stereoscopic image analysis is calculated, in a state where the surface in which the cover area of the flat surface is large or the surface in which the area that is in contact with the flat surface is large, among the outer surfaces of the silica particle, is set as a bottom side $H_0$ by measuring the highest position $H_{max}$ from $H_0$, when the outer surfaces of the silica particle are scanned by a roughness analysis device. That is, the maximum height H of the silica particle obtained by the stereoscopic image analysis represents a distance from $H_{max}$ to $H_0$, what is called the thickness of the flat silica particle.

On the other hand, the circle equivalent diameter Da of the silica particle obtained by the flat image analysis is the same as H, and is a circle equivalent diameter that is measured from a secondary analysis from the projection area of the silica particle that is in contact with the flat surface, when the surface in which the cover area of the flat surface is large or the surface in which the area that is in contact with the flat surface is large, among the outer surfaces of the silica particle, is set as a bottom side.

Accordingly, when the average value of the ratios (Da/H) of the circle equivalent diameters Da of the silica particles obtained by the flat image analysis to the maximum heights H of the silica particles obtained by the stereoscopic image analysis is 1, the silica particles are spherical shapes, and as the Da/H becomes large, the silica particles become thin scale-like particles.

That is, the silica particles according to the present exemplary embodiment are the irregular-shaped primary particles having a predetermined average particle diameter, which are silica particles having a thick and flat configuration with Da/H of more than 1.5 and less than 1.9.

The silica particles tend to be spherical and hardly dispersed on the front surface of the attachment target as the volume average particle size decreases, and tend to be damaged by mechanical load from the outside as they become large. Further, as the average circularity degree increases, the silica particles are close to spherical. Thus, in a case where the silica particles are added to the attachment target, adhesiveness to the attachment target deteriorates, and it is difficult to maintain the flowability of the attachment target. On the other hand, as the average circularity degree of the silica particles becomes small, the degree of the irregular shapes becomes large. Thus, in a case where mechanical load from the outside is applied thereto, the silica particles are easily damaged. Further, the flat silica particles are easily attached to the surface of the flat attachment target due to their flat shapes, and thus, the silica particles are easily damaged when an outside force is applied thereto and are easily separated from the attachment target as the thickness is large. On the other hand, if the thickness is excessively thin, the particles become frail and durability of the particles deteriorates.

For this reason, the silica particles according to the present exemplary embodiment have the above-described configuration, and thus, in a case where the silica particles are attached to the attachment target, although mechanical load is applied from the outside, it is difficult for the silica particles to be damaged or separated. Thus, the flowability of the attachment target of the silica particles may be maintained.

Hereinafter, the silica particles of the present exemplary embodiment will be described in detail.

Physical Properties
—Volume Average Particle Size—

The silica particles of the present exemplary embodiment have a volume average particle size of from 100 nm to 500 nm.

When the volume average particle size is less than 100 nm, the shapes of the particles easily become spherical, and the circularity degree cannot become from 0.5 to 0.85. Further, in a case where the silica particles cover the attachment target such as resin particles, iron powder or the like, it is difficult for the silica particles to be dispersed on the surface of the attachment target. If the volume average particle size exceeds 500 nm, in a case where mechanical load is applied to the silica particles, the silica particles are easily damaged. Further, in a case where the silica particles cover the attachment target, it is difficult to enhance the strength of the attachment target, and to enhance the flowability of the attachment target to which the silica particles are attached.

The volume average particle size is preferably from 100 nm to 350 nm, and more preferably from 100 nm to 250 nm.

The volume average particle size of the silica particles is obtained as a 50% diameter (D50v) in accumulation frequency of the volume particle sizes measured by a Coulter LS (particle size measuring device made by Beckman Coulter Inc.).

—Average Circularity Degree—

The silica particles of the present exemplary embodiment have an average circularity degree of primary particles of from 0.5 to 0.85.

If the average circularity degree of the primary particles exceeds 0.85, since the primary particles are close to the sphere, when the silica particles are added to the attachment target such as resin particles, powder or the like, mixing performance or adhesiveness to the attachment target is deteriorated, the particles become weak to mechanical load, and it is difficult to maintain the flowability of the attachment target. Thus, for example, when the silica particles and the resin particles are mixed to be stirred, or after the silica particles and the resin particles are stored over time, the silica particles may be biased to be attached to the resin particles or the like or may be separated from the resin particles or the like. If the average circularity degree of the primary particles is less than 0.5, the aspect ratio of the particles becomes large, and stress concentration is generated in a case where mechanical load is applied to the silica particles, so that the silica particles are easily damaged. In a case where the silica particles according to the present exemplary embodiment are manufactured by a sol-gel method, it is difficult to manufacture the silica particles in which the average circularity degree of the primary particles is less than 0.5.

It is preferable that the average circularity degree of the primary particles is from 0.6 to 0.8.

The circularity degree of the primary particles is obtained as "100/SF2" calculated by the following Expression (1) from the flat image analysis of the primary particles obtained by observing the primary particles after the silica particles are dispersed in the resin particles (polyester, weight-average molecular weight Mw=50000) of a particle size of 100 µm by an SEM device.

$$\text{Circularity degree } (100/SF2) = 4\pi \times (A/I^2) \qquad \text{Expression (1)}$$

In Expression (1), I represents the peripheral length of the primary particle on the image, and A represents the projection area of the primary particle.

The average circularity degree of the primary particles is obtained as a 50% circularity degree in accumulation frequency of the circularity degrees of 100 primary particles obtained by the flat image analysis.

—The Ratios (Da/H) of the Circle Equivalent Diameters Da of the Silica Particles Obtained by the Flat Image Analysis to the Maximum Heights H of the Silica Particles Obtained by the Stereoscopic Image Analysis—

The silica particles of the present exemplary embodiment have the average value of the ratios (Da/H) of the "circle equivalent diameters Da of the silica particles obtained by the flat image analysis" to the "maximum heights H of the silica particles obtained by the stereoscopic image analysis" of more than 1.5 and less than 1.9.

The average value of Da/H is an average value of Da/H of the respective silica particles obtained by measuring Da and H with respect to the respective silica particles.

If the average value of Da/H is 1.9 or more, the shapes of the silica particles are close to scale-like shapes, and in a case where mechanical load is applied to the silica particles, the silica particles are easily damaged. As a result, it is difficult to maintain the flowability of the attachment target. If the average value of Da/H is 1.5 or less, the thickness of the flat particles become large, and the shapes of the silica particles become far-removed from the flat shapes. Thus, the attachment area to the attachment target is reduced, the heights H of the silica particles increase, and the silica particles become a structure that easily withstands mechanical load from the outside. Accordingly, it is difficult to maintain the flowability of the attachment target.

The average value of Da/H is preferably from 1.6 to 1.85, and more preferably from 1.65 to 1.8.

The maximum heights H of the silica particles and the circle equivalent diameters Da are calculated in the following order.

With respect to particles obtained by dispersing and attaching the silica particles to zirconia beads that have a particle size of 100 µm and have smooth surfaces, a height analysis in the X-Y axial direction is performed for each 10 nm in a field of view of a magnification of 10,000 times using an electron beam 3D roughness analysis device (ERA-8900: made by Elionix Inc.), and the height is calculated and a 2D image of a magnification of 10,000 times in the same field of view is photographed at the same time.

Next, with respect to the 2D image, the circle equivalent diameter Da is calculated according to the following Expression (2) from the area calculated under the condition of 0.010000 µm/pixel using an image analysis software Win-ROOF (made by Mitani, Inc.), and a particle number is assigned to each particle.

$$\text{Circle equivalent diameter} = 2\sqrt{(\text{area}/\pi)} \qquad \text{Expression (2)}$$

Further, by imaging the height analysis numerical values by a conditional format (bicolor scale) using Microsoft Excel spreadsheet software (written by Microsoft Corporation), matching with the particle number for each particle is achieved and the maximum height H for each particle number in the individual particle is calculated.

Further, the average value of Da/H is an average of 100 measured silica particles.

[Component, Surface Treatment]

The silica particles according to the present exemplary embodiment may be particles that include silica, that is, $SiO_2$ as a main component, which may be crystalline or amorphous. Further, they may be particles manufactured by using silicon compounds such as water glass, alkoxysilanes as raw materials, or may be particles obtained by crushing quartz.

Further, from the view-point of the dispersibility of the silica particles, it is preferable that the surfaces of the silica particles be hydrophobized. For example, by covering the surfaces of the silica particles by alkyl groups, the silicon particles are hydrophobized. To this end, for example, a known organic silicon compound having the alkyl group may act on the silica particles. Details about the method of hydrophobization will be described later.

As described above, the silica particles according to the present exemplary embodiment are irregular-shaped silica particles that maintain the flowability of the attachment target (for example, resin particles, iron powder or the like), which easily maintain the irregular shapes, for example, even though the silica particles are mixed with the resin particles or iron powder to be stirred, and thus, the flowability of the resin particles is superior. Thus, the silica particles according to the present exemplary embodiment may be applied to a variety of fields such as toners, cosmetics, abrading agents.

<Method of Manufacturing Silica Particles>

The method of manufacturing the silica particles according to the present exemplary embodiment is not particularly limiting, as long as obtained silica particles have the volume average particle size of from 100 nm to 500 nm, the average circularity degree of from 0.5 to 0.85, and the average value of the ratios of the circle equivalent diameters Da obtained by the flat image analysis to the maximum heights H obtained by the stereoscopic image analysis of more than 1.5 and less than 1.9.

For example, the silica particles may be obtained by a dry method of crushing and classifying silica particles that have a particle size of more than 500 nm, or the silica particles may be manufactured by a so-called wet method of generating particles by a sol-gel method using silicon compound represented as alkoxysilane as a raw material. As the wet method, there is also a method of obtaining silica sol using water glass as raw material, instead of the sol-gel method.

In order to manufacture the silica particles having the above-described physical properties according to the present exemplary embodiment, it is preferable to adopt a method of manufacturing silica particles according to an exemplary embodiment of the present invention, having the following processes.

The method of manufacturing the silica particles according to the exemplary embodiment includes a process of preparing an alkali catalyst solution in which an alkali catalyst is included in a solvent that contains alcohol, a first supply process of supplying, until the supply amount of tetraalkoxysilane reaches from 0.002 mol/mol to 0.008 mol/mol (or from about 0.002 mol/mol to about 0.008 mol/mol) with respect to the amount of the alcohol in the preparation process, the tetraalkoxysilane and the alkali catalyst to the alkali catalyst solution, a supply stopping process of stopping the supply of the tetraalkoxysilane and the alkali catalyst for a period of time of from 0.5 min to 10 min (or from about 0.5 min to about 10 min) after the first supply process, and a second supply process of supplying the tetraalkoxysilane and the alkali catalyst to the alkali catalyst solution after the supply stopping process.

That is, in the method of manufacturing the silica particles according to the present exemplary embodiment, the tetraalkoxysilane that is raw material and the alkali catalyst that is a catalyst different therefrom are respectively supplied under the existence of the alcohol included in the alkali catalyst, the supply of both the tetraalkoxysilane and the alkali catalyst is stopped at least one time in the middle of the reaction of the tetraalkoxysilane, and then the supply of the tetraalkoxysilane and the alkali catalyst is restarted, to thereby generate irregular-shaped flat silica particles.

In the method of manufacturing the silica particles according to the present exemplary embodiment, the irregular-shaped silica particles having the volume average particle size of from 100 nm to 500 nm, the average value of Da/H of more than 1.5 and less than 1.9, and the average circularity degree of from 0.5 to 0.85 are obtained. Although not clear, the following may be considered as the reason.

Firstly, the alkali catalyst solution in which the alkali catalyst is included in the solvent that contains the alcohol is prepared. If the tetraalkoxysilane and the alkali catalyst are respectively supplied to the solution, the tetraalkoxysilane supplied to the alkali catalyst solution reacts to generate nucleus particles. At this time, in addition to the catalyst operation, the alkali catalyst is disposed on the surfaces of the generated nucleus particles to contribute to the shapes, dispersion stability and the like of the nucleus particles. However, since the alkali catalyst does not uniformly cover the surfaces of the nucleus particles (that is, since the alkali catalyst is biased to be attached to the surfaces of the nucleus particles), nucleus partial biasing occurs in surface tension and chemical hydrophilicity of the nucleus particles while maintaining the dispersion stability of the nucleus particles, to thereby generate the irregular-shaped nucleus particles.

Further, if the tetraalkoxysilane and the alkali catalyst are respectively supplied continuously, the generated nucleus particles are grown by the reaction of the tetraalkoxysilane.

At this time, when the supply amount of the tetraalkoxysilane becomes the above-described specific concentration, the supply of the tetraalkoxysilane and the alkali catalyst is stopped for the above-described specific time, and then the supply is restarted.

By stopping the supply of the tetraalkoxysilane and the alkali catalyst, although the reason is not clear, it is considered that the particles in the reaction system are aggregated in the flat shapes. Here, if the stop of the supply of the tetraalkoxysilane and the alkali catalyst is too early, that is, if the supply amount of the tetraalkoxysilane is small, it is considered that the particle concentration in the reaction system is low and the probability of collision of the particles is low, and thus, it is difficult for aggregation to be performed. On the other hand, if the stop of the supply of the tetraalkoxysilane and the alkali catalyst is late and the supply amount of the tetraalkoxysilane is large, it is considered that the nucleus particles are excessively grown, and the particles are stable and difficult to aggregate, and thus, the flat particles are not formed.

Further, if the time of stopping the supply of the tetraalkoxysilane and the alkali catalyst is short, the aggregation amount of the particles is not sufficient, and if the stop time is long, the particles are excessively aggregated and tend to take the form of a gel.

Further, by forming the irregular-shaped flat silica particles in the supply stopping process, and by restarting the supply of the tetraalkoxysilane and the alkali catalyst to facilitate the particle growth, it is considered that the silica particles having the flat shapes in which the average value of Da/H is more than 1.5 and less than 1.9 and the irregular shapes in which the volume average particle size is from 100 nm to 500 nm and the average circularity degree of from 0.5 to 0.85 are obtained.

Further, in the method of manufacturing the silica particles according to the present exemplary embodiment, since it is considered that the irregular-shaped nucleus particles are generated and the nucleus particles are grown while maintaining the irregular shapes to generate the silica particles, it is considered that the irregular-shaped silica particles having high shape stability to mechanical load are obtained.

Further, in the method of manufacturing the silica particles according to the present exemplary embodiment, since it is considered that the generated irregular-shaped nucleus particles are grown while maintaining the irregular shapes to obtain the silica particles, it is considered that the silica particles that are strong to mechanical load and are hardly damaged are obtained.

Furthermore, in the method of manufacturing the silica particles according to the present exemplary embodiment, by respectively supplying the tetraalkoxysilane and the alkali catalyst to the alkali catalyst solution to cause the reaction of the tetraalkoxysilane, the particles are generated. Thus, compared with a case where the irregular-shaped silica particles are manufactured by the sol-gel method in the related art, the total usage amount of alkali catalyst is reduced, and consequently, a removing process of the alkali catalyst may be omitted. This is effective in a case where the silica particles are applied to products that require high purity.

Hereinafter, the method of manufacturing the silica particles according to the present exemplary embodiment will be described in detail.

The method of manufacturing the silica particles according to the present exemplary embodiment is mainly divided into two processes. One is a process (preparation process) of preparing the alkali catalyst solution and the other is a process (particle generation process) of generating silica particles by supplying the tetraalkoxysilane and the alkali catalyst to the alkali catalyst solution.

The particle generation process is divided into at least three steps, which includes the first supply process of supplying the tetraalkoxysilane and the alkali catalyst to the alkali catalyst solution to start generation of the silica particles, the supply stopping process of stopping the supply of the tetraalkoxysilane and the alkali catalyst (also referred to as a maturing process), and thereafter, the second supply process of restarting the supply of the tetraalkoxysilane and the alkali catalyst.

[Preparation Process]

In the preparing process, the solvent that contains the alcohol is prepared and the alkali catalyst is added thereto, to prepare the alkali catalyst solution.

The solvent that contains the alcohol may be a single alcohol solvent, or may be a mixed solvent with a different solvent such as water, ketones including acetone, methylethyl ketone, methylisobutyl ketone or the like, cellosolves including methycellosolve, ethylcellosolve, butylcellosolve, cellosolve acetate or the like, or ethers including dioxane, tetrahydrofuran or the like, as necessary. In the case of the mixed solvent, the concentration of the alcohol in the other solvent is preferably 80 mass % or more (more preferably 90 mass % or more).

As the alcohol, for example, a lower alcohol such as methanol or ethanol may be used.

On the other hand, the alkali catalyst is a catalyst for promoting the reaction (hydrolytic reaction, condensing reaction) of the tetraalkoxysilane. For example, a basic catalyst such as ammonia, iodine, monoamine or quaternized ammonium salt is used as the alkali catalyst, and particularly, ammonium is preferable.

The concentration (content) of the alkali catalyst is preferably from 0.6 mol/L to 0.85 mol/L (or from about 0.6 mol/L to about 0.85 mol/L), more preferably from 0.63 mol/L to 0.78 mol/L, most preferably from 0.66 mol/L to 0.75 mol/L.

If the concentration of the alkali catalyst is 0.6 mol/L or more, when the tetraalkoxysilane is supplied in the particle generation process, the dispersibility of the nucleus particles in the growth process of the generated nucleus particles is stabilized, and thus, it is possible to suppress generation of rough aggregated substances such as secondary aggregated substances and to suppress gelation of the particles.

On the other hand, if the concentration of the alkali catalyst is larger than 0.85 mol/L, the stability of the generated nucleus particles becomes excessive to generate nucleus particles of the true spherical shapes. Thus, it is difficult to obtain the irregular-shaped nucleus particles having the average circularity degree of 0.85 or less. As a result, it is difficult to obtain the irregular-shaped silica particles.

The concentration of the alkali catalyst is a concentration in the alcohol catalyst solution (the alkali catalyst and the solvent including the alcohol).

[Particle Generation Process]

Next, the particle generation process will be described.

In the particle generation process, the tetraalkoxysilane and the alkali catalyst are respectively supplied to the alkali catalyst solution, and the tetraalkoxysilane reacts (hydrolytic reaction, condensing reaction) in the alkali catalyst solution, to thereby generate the silica particles. In the method of manufacturing the silica particles according to the present exemplary embodiment, while the particles are growing in this way, the supply of the added components is stopped to cause aggregation, to thereby form the irregular-shaped flat particles.

—First Supply Process—

The first supply process is a process of supplying the tetraalkoxysilane and the alkali catalyst to the alkali catalyst solution. The tetraalkoxysilane is supplied until it becomes from 0.002 mol/mol to 0.008 mol/mol with respect to the amount of the alcohol in the preparation process.

Here, the "concentration of from 0.002 mol/mol to 0.008 mol/mol with respect to the amount of the alcohol in the preparation process" means "from 0.002 mol to 0.008 mol with respect to a unit mol amount (1 mol) of the alcohol in the alkali catalyst solution prepared in the preparation process".

If the supply amount of the tetraalkoxysilane in the first supply process is smaller than 0.002 mol/mol with respect to the amount of the alcohol in the alkali catalyst solution prepared in the preparation process, the particle concentration in the nucleus particle forming step becomes low, and thus, the aggregation of the particles is not performed, the particles having a low level of irregular shapes are formed, and the flowability maintenance is deteriorated.

On the other hand, if the supply amount of the tetraalkoxysilane is larger than 0.008 mol/mol with respect to the amount of the alcohol in the alkali catalyst solution prepared in the preparation process, the nucleus particles are stabilized, and thus, the aggregation of the particles is not performed, the particles having a low level of irregular shapes are formed, and the flowability is hardly maintained.

The supply amount of the tetraalkoxysilane in the first supply process is preferably from 0.003 mol/mol to 0.008 mol/mol with respect to the amount of the alcohol in the alkali catalyst solution prepared in the preparation process, and more preferably from 0.006 mol/mol to 0.008 mol/mol.

As the tetraalkoxysilane supplied to the alkali catalyst solution, for example, a silane compound such as a tetrafunctional silane compound may be used.

Specifically, for example, tetramethoxysilane, tetraethoxysilane, tetrapropoxysilane, tetrabutoxysilane, or the like may be used, but from the viewpoint of controllability of reaction speed or shapes, particle sizes, particle size distributions and the like of the obtained silica particles, tetramethoxysilane or tetraethoxysilane is preferably used.

In the first supply process, the nucleus particles are formed by the reaction of the tetraalkoxysilane, in the early supply stage of the tetraalkoxysilane and the alkali catalyst (nucleus particle forming step), and then, the supply is facilitated, to thereby grow the nucleus particles (nucleus particle growing step).

As described above, it is preferable that the alkali catalyst solution that is the target to which the tetraalkoxysilane and the alkali catalyst are supplied have the concentration (content) of the alkali catalyst of from 0.6 mol/L to 0.85 mol/L.

Accordingly, it is preferable that the first supply process include the nucleus particle forming process of supplying the tetraalkoxysilane and the alkali catalyst to the alkali catalyst solution in which the alkali catalyst is included with the concentration of from 0.6 mol/L to 0.85 mol/L to form the nucleus particles. The preferable range of the concentration of the alkali catalyst of the alkali catalyst solution is as described above.

It is preferable that the supply rate of the tetraalkoxysilane is from 0.001 mol/(mol·min) to 0.010 mol/(mol·min) with respect to the alcohol in the alkali catalyst solution.

This means that the tetraalkoxysilane is supplied at the supply amount of from 0.001 mol to 0.010 mol per minute with respect to the alcohol of 1 mol used in the process of preparing the alkali catalyst solution.

By setting the supply rate of the tetraalkoxysilane in the above-described range, the irregular-shaped silica particles having the average circularity degree of from 0.5 to 0.85 are easily generated at high rates (for example, 95% or more in number).

The particle size of the silica particles depends on the type or reaction condition of the tetraalkoxysilane, but, for example, by setting the total supply amount of the tetraalkoxysilane used in the reaction of the particle generation to 1.08 mol or more with respect to a silica particle dispersion of 1 L, the primary particles having a particle size of 100 nm or more are obtained, and by setting the total supply amount of the tetraalkoxysilane used in the reaction of the particle generation to 5.49 mol or less with respect to the silica particle dispersion of 1 L, the primary particles having a particle size of 500 nm or less are obtained.

It is considered that if the supply rate of the tetraalkoxysilane is lower than 0.001 mol/(mol·min), the tetraalkoxysilane may be supplied to the nucleus particles without being biased before the reaction of the nucleus particles and the tetraalkoxysilane, and thus, the particle sizes and the shapes are not biased, and the silica particles having similar shapes are generated.

If the supply rate of the tetraalkoxysilane is 0.010 mol/(mol·min) or less, the supply amount for the reaction of the tetraalkoxysilane in the nucleus particle forming step or the reaction of the tetraalkoxysilane and the nucleus particles in the particle growth does not become excessive, it is difficult for the reaction system to become gelated, and it is difficult to obstruct the formation of the nucleus particles and the particle growth.

The supply rate of the tetraalkoxysilane is preferably from 0.0065 mol/(mol·min) to 0.0085 mol/(mol·min), more preferably from 0.007 mol/(mol·min) to 0.008 mmol/(mol·min).

On the other hand, as the alkali catalyst supplied to the alkali catalyst solution, the above-described catalysts may be used, for example. The alkali catalyst to be supplied may be the same type as the alkali catalyst that is included in advance in the alkali catalyst solution or may be a different type, but the same type is preferable.

The supply amount of the alkali catalyst is preferably from 0.1 mol to 0.4 mol per 1 mol of the total supply amount of the tetraalkoxysilane supplied per minute, more preferably from 0.14 mol to 0.35 mol, and most preferably from 0.18 mol to 0.30 mol.

By setting the supply amount of the alkali catalyst to 0.1 mol or more, the dispersibility of the nucleus particles in the growth process of the generated nucleus particles becomes stable, and thus, rough aggregated substances such as secondary aggregated substances hardly occur, and the particles are hardly gelated.

On the other hand, by setting the supply amount of the alkali catalyst to 0.4 mol or less, the stability of the generated nucleus particles hardly becomes excessive, and thus, the irregular-shaped nucleus particles formed in the nucleus particle forming step are suppressed from being grown in spherical shapes in the nucleus particle growing step.

—Supply Stopping Process (Maturing Process)—

In the supply stopping process, after the tetraalkoxysilane and the alkali catalyst are supplied by the first supply process until the tetraalkoxysilane becomes the above-described concentration, the supply of the tetraalkoxysilane and the alkali catalyst is stopped for a period of time of from 0.5 min to 10 min.

The supply stopping process is what is called a maturing process of once stopping the supply of the tetraalkoxysilane and the alkali catalyst and facilitating the aggregation of the nucleus particles for maturing.

In a case where the supply stopping time of the tetraalkoxysilane and the alkali catalyst in the maturing process is shorter than 0.5 min, the aggregation of the particles are not sufficiently performed, and thus, the particles having a low level of irregular shapes are formed, and the flowability maintenance is deteriorated.

In a case where the supply stopping time of the tetraalkoxysilane and the alkali catalyst in the maturing process is longer than 10 min, the aggregation of the particles are excessively performed, and thus, the dispersibility of the particles are damaged, and it is difficult to achieve excellent irregular-shaped silica.

The supply stopping time of the tetraalkoxysilane and the alkali catalyst in the maturing process is preferably from 0.6 min to 5 min, and more preferably from 0.8 min to 3 min.

—Second Supply Process—

In the second supply process, the tetraalkoxysilane and the alkali catalyst are again supplied after the supply stopping process. The supply of the tetraalkoxysilane and the alkali catalyst that are stopped by the supply stopping process is restarted, to grow the aggregation body of the nucleus particles, thereby further increasing the volume average particle size of the irregular-shaped flat silica particles.

In the second supply process, preferable ranges of the concentration and the supply amount of the tetraalkoxysilane and the concentration and the supply amount of the alkali catalyst supplied to the reaction system are the same as in the first supply process.

In the second supply process, the concentration and the supply amount of the tetraalkoxysilane and the concentration and the supply amount of the alkali catalyst supplied to the reaction system may be different from the concentration and the supply amount of the tetraalkoxysilane and the concentration and the supply amount of the alkali catalyst supplied to the reaction system in the first supply process.

In the particle generation process (including the first supply process, the maturing process and the second supply process), the temperature of the alkali catalyst solution (temperature at the time of supply) is, for example, preferably from 5° C. to 50° C. and more preferably in the range of from 15° C. to 40° C.

Further, the method of manufacturing the silica particles according to the present exemplary embodiment may have one or more supply stopping processes after the second supply process or may have a supply process of supplying the tetraalkoxysilane and the alkali catalyst.

The silica particles are obtained through the above-described processes. In this state, the obtained silica particles are obtained in the state of dispersion, but may be used as the silica particle dispersion as it is, or may be extracted and used as powder of the silica particles by removing the solvent.

In the case of being used as the silica particle dispersion, the silica particle solid content concentration may be adjusted by diluting or concentrating the silica particle dispersion with water or alcohol as necessary. Further, the silica particle dispersion may be replaced by a water soluble organic solvent such as alcohols, esters, or ketones.

On the other hand, in the case of being used as the silica particle power, it is necessary to remove the solvent from the silica particle dispersion, but as a method of removing the solvent, known methods such as 1) a method of removing the solvent by filtering, centrifugal separation, deposition or the like and then drying the solvent by a vacuum dryer, a shelf stage dryer or the like, or 2) a method of directly drying slurry by a flowing layer dryer, a spray dryer or the like, are used, for example. The drying temperature is not particularly limiting, but preferably 200° C. or lower. If the temperature is higher than 200° C., combination of primary particles or generation of coarse particles easily occur due to condensation of a silanol group that remains on the surfaces of the silica particles.

In the dried silica particles, it is preferable that coarse particles or aggregated substances be removed by crushing or sieving as necessary. The crushing method is not particularly limiting, but for example, is performed by a dry type crushing device such as a jet mill, a vibration mill, a ball mill or a pin mill. The sieving method is performed by known devices such as a vibration sifter or a wind power sieving machine, for example.

The silica particles obtained by the method of manufacturing the silica particles according to the present exemplary embodiment may be used with the surfaces of the silica particles being hydrophobized by a hydrophobizing agent.

As the hydrophobizing agent, for example, known organic silicon compounds having, for example, an alkyl group (for example, methyl group, ethyl group, propyl group, butyl group or the like) is used. Specifically, for example, a silazane compound (for example, a silane compound such as methyltrimethoxysilane, dimethyldimethoxysilane, trimethylchlorosilane or trimethylmethoxysilane, hexamethyldisilazane, tetramethyldisilazane, or the like) or the like is used. The hydrophobizing agent may be a single type or plural types.

Among the hydrophobizing agents, the organic silicon compound having a trimethyl group such as trimethylmethoxysilane or hexamethyldisilazane is preferably used, and hexamethyldisilazane is more preferably used.

The usage amount of the hydrophobizing agent is not particularly limiting, but the usage amount thereof is preferably from 1 mass % to 100 mass % (or from about 1 mass % to about 100 mass %), and more preferably from 5 mass % to 80 mass % with respect to the silica particles, for example, to achieve the hydrophobization effect.

As a method of obtaining the hydrophobic silica particle dispersion in which the hydrophobization is performed by the hydrophobizing agent, for example, there is a method of adding the hydrophobizing agent of a necessary amount to the silica particle dispersion and reacting them in a temperature range of from 30° C. to 80° C. while being stirred, to perform the hydrophobization for the silica particles and to obtain the hydrophobic silica particle dispersion. If the reaction temperature is lower than 30° C., the hydrophobization reaction is hardly performed, and if the reaction temperature is higher than 80° C., gelation of the dispersion, aggregation of the silica particles or the like may be easily generated due to self condensation of the hydrophobizing agent.

On the other hand, as a method of obtaining the hydrophobic silica particles of the powder, there is a method of obtaining the hydrophobic silica particle dispersion by the above-described method and then drying the result to obtain the powder of the hydrophobized silica particles by the above-described method, a method of drying the silica particle dispersion to obtain powder of hydrophilic silica particles and then adding the hydrophobizing agent thereto to perform the hydrophobization and to obtain the powder of the hydrophobic silica particles, a method of obtaining the hydrophobic silica particle dispersion, drying it to obtain the powder of the hydrophobic silica particles, and then adding the hydrophobizing agent thereto to perform the hydrophobization and to obtain the powder of the hydrophobized silica particles, or similar methods.

Here, as a method of hydrophobizing the silica particles of the powder, there is a method of stirring the hydrophilic silica particles of the powder in a processing tank such as a Henschel mixer or fluid bed, adding the hydrophobizing agent thereto, and heating the inside of the processing tank, to thereby gasify the hydrophobizing agent to react with the silanol group of the surfaces of the silica particles of the powder, for example. The processing temperature is not particularly limiting. However, for example, the temperature is preferably from 80° C. to 300° C., and more preferably from 120° C. to 200° C.

EXAMPLES

Hereinafter, the present exemplary embodiments will be specifically described with reference to examples. Here, the respective examples do not limit the present exemplary embodiments. Further, "parts" and "%" are based on mass unless noted otherwise.

Example 1

Preparation Process [Preparation of Alkali Catalyst Solution (1)]

200 parts of methanol, 36 parts of 10% ammonia water are contained in a reaction container, made of glass, having an impeller, a drip nozzle and a thermometer and mixed and stirred, to thereby obtain an alkali catalyst solution (1). At this time, the ammonia catalyst amount of the alkali catalyst solution (1): the amount of $NH_3$ ($NH_3$ [mol]/($NH_3$+methanol+water) [L]) is 0.73 mol/L.

—Particle Generation Process [Preparation of Silica particle suspension (1)]—

(First Supply Process)

Next, the temperature of the alkali catalyst solution (1) is adjusted to be 30° C., and the alkali catalyst solution (1) is replaced by nitrogen gas. Then, while stirring the alkali catalyst solution (1) at the speed of 120 rpm, tetramethoxysilane (TMOS) and ammonia water in which the concentration of the catalyst ($NH_3$) is 3.7% are dripped at the flow rates of 4 parts/min and 2.4 parts/min, respectively to start the supply thereof at the same time.

At the time when 1.5 min elapses after the start of the supply of the tetramethoxysilane and the ammonia water, the supply of the tetramethoxysilane and the ammonia water is stopped at the same time. The supply amount of tetramethoxysilane at the time when the supply of the tetramethoxysilane and the ammonia water is stopped is 0.0063 mol/mol with respect to the amount of the alcohol added to the reaction container in the preparation process.

(Maturing Process)

The supply stopping time of the tetramethoxysilane and the ammonia water is 1 min.

(Second Supply Process)

After 1 min elapses from the supply stop of the tetramethoxysilane and the ammonia water, the supply of the tetramethoxysilane and the ammonia water is restarted. At the time of supply, adjustment is performed so that the flow rates of the tetramethoxysilane and the ammonia water are 4 parts/min and 2.4 parts/rain, respectively, and the tetramethoxysilane and the ammonia water are then dripped.

The total addition amount of the tetramethoxysilane and the 3.7% ammonia water in the entire processes including the first supply process and the second supply process includes 90 parts of the tetramethoxysilane and 54 parts of the 3.7% ammonia water.

After dripping the 90 parts of the tetramethoxysilane and the 54 parts of the 3.7% ammonia water, the suspension (1) of the silica particles is obtained.

(Solvent Removal and Drying)

Thereafter, the solvent of the obtained silica particle suspension (1) distils away by 150 parts by heating distillation, the pure water is added by 150 parts, and drying is then performed by a freeze dryer, to thereby obtain irregular-shaped hydrophilic silica particles (1).

—Silica Particle Hydrophobization—

Further, 7 parts of hexamethyldisilzane is added to the hydrophilic silica particles (1) of 35 g and reaction thereof is performed for two hours at 150° C., to thereby obtain the irregular-shaped hydrophobic silica particles [irregular-shaped silica particles (1)] in which the silica surfaces are hydrophobized.

As a result of measuring the volume average particle size (D50v), the average circularity degree [100/SF2] and Da/H for the obtained irregular-shaped silica particles (1), by the above-described method, the volume average particle size is 170 nm, the average circularity degree is 0.73, and the average value of Da/H is 1.72. These characteristics are shown in Table 1.

(Flowability Maintenance Evaluation when being Dispersed in Resin Particles)

The flowability maintenance when the irregular-shaped silica particles (1) are dispersed in the attachment target (resin particles) is evaluated by the following method.

The 0.05 g of irregular shaped silica particles (1) are added to the 2 g of resin particles having a particle size of 10 µm and are vibrated to be mixed for 60 minutes using a vibrator. Then, the mixture is located on a sifter of 75 µm to vibrate for 90 seconds with the amplitude of 1 mm. The dropping pattern of the resin particles is observed to perform evaluation on the basis of the following evaluation standards.

—Evaluation Standards (Flowability)—

A: Resin particles do not remain on the sifter at all.

B: Resin particles almost all do not remain on the sifter (more than 0% and less than 5% of the entire amount).

C: Resin particles slightly remain on the sifter (5% or more and less than 20% of the entire amount).

D: Resin particles remain quite a lot on the sifter (20% or more of the entire amount).

The manufacturing conditions, shape characteristics and evaluation results of the irregular-shaped silica particles (1) are shown in Table 1.

Example 2

By setting the time from the start of the simultaneous dripping of the tetramethoxysilane and the 3.7% ammonia water to the stop thereof to 0.6 minutes, by setting the addition amount of the tetramethoxysilane at that time to 0.0025 mol/mol with respect to the alcohol added in the preparing process, and by setting the other conditions to be the same as in the manufacturing of the irregular-shaped silica particles (1) in Example 1, irregular-shaped hydrophobic silica particles (2) are obtained.

In the irregular-shaped silica particles (2), the volume average particle size is 120 nm, the average circularity degree [100/SF2] is 0.82, and the average value of Da/H is 1.55.

Example 3

By setting the time from the start of the simultaneous dripping of the tetramethoxysilane and the 3.7% ammonia water to the stop thereof to 1.8 minutes, by setting the addition amount of the tetramethoxysilane at that time to 0.0076 mol/mol with respect to the alcohol added in the preparing process, and by setting the other conditions to be the same as in the manufacturing of the irregular-shaped silica particles (1) in Example 1, irregular-shaped hydrophobic silica particles (3) are obtained.

In the irregular-shaped silica particles (3), the volume average particle size is 300 nm, the average circularity degree [100/SF2] is 0.83, and the average value of Da/H is 1.7.

Example 4

By setting the time from the start of the simultaneous dripping of the tetramethoxysilane and the 3.7% ammonia water to the restart of the dripping through the drip for the predetermined time and the simultaneous stop thereof to 0.6 minutes, and by setting the other conditions to be the same as in the manufacturing of the irregular-shaped silica particles (1) in Example 1, irregular-shaped hydrophobic silica particles (4) are obtained.

In the irregular-shaped silica particles (4), the volume average particle size is 180 nm, the average circularity degree [100/SF2] is 0.83, and the average value of the ratios of the circle equivalent diameters Da of the silica particles to the maximum heights H of the silica particles is 1.6.

Example 5

By setting the time from the start of the simultaneous dripping of the tetramethoxysilane and the 3.7% ammonia water to the restart of the drip through the drip nozzle for the predetermined time and the simultaneous stop thereof to 9.5 minutes, and by setting the other conditions to be the same as in the manufacturing of the irregular-shaped silica particles (1) in Example 1, irregular-shaped hydrophobic silica particles (5) are obtained.

In the irregular-shaped silica particles (5), the volume average particle size is 250 nm, the average circularity degree [100/SF2] is 0.55, and the average value of the ratios of the circle equivalent diameters Da of the silica particles to the maximum heights H of the silica particles is 1.8.

Example 6

By setting the total addition amount of the tetramethoxysilane to 250 parts, by setting the time from the start of the simultaneous dripping of the tetramethoxysilane and the 3.7% ammonia water to the restart of the drip through the drip nozzle for the predetermined time and the simultaneous stop thereof to 6 minutes, and by setting the other conditions to be the same as in the manufacturing of the irregular-shaped silica particles (1) in Example 1, irregular-shaped hydrophobic silica particles (6) are obtained.

In the irregular-shaped silica particles (6), the volume average particle size is 450 nm, the average circularity degree [100/SF2] is 0.8, and the average value of the ratios of the circle equivalent diameters Da of the silica particles to the maximum heights H of the silica particles is 1.6.

Comparative Example 1

By setting the total addition amount of the tetramethoxysilane to 350 parts, by setting the time from the start of the simultaneous dripping of the tetramethoxysilane and the 3.7% ammonia water to the stop thereof to 0.2 minutes, by setting the addition amount of the tetramethoxysilane at that time to 0.0008 mol/mol with respect to the alcohol added in the preparing process, by setting the time from the stop of the dripping to the restart of the dripping to 0.3 minutes, and by setting the other conditions to be the same as in the manufacturing of the irregular-shaped silica particles (1) in Example 1, irregular-shaped hydrophobic silica particles (7) are obtained.

In the irregular-shaped silica particles (7), the volume average particle size is 600 nm, the average circularity degree [100/SF2] is 0.8, and the average value of Da/H is 1.4.

Comparative Example 2

By setting the total addition amount of the tetramethoxysilane to 40 parts, by setting the time from the start of the simultaneous dripping of the tetramethoxysilane and the 3.7% ammonia water to the stop thereof to 0.3 minutes, by setting the addition amount of the tetramethoxysilane at that time to 0.0013 mol/mol with respect to the alcohol added in the preparing process, by setting the time from the stop of the dripping to the restart of the dripping to 0.3 minutes, and by setting the other conditions to be the same as in the manufacturing of the irregular-shaped silica particles (1) in Example 1, irregular-shaped hydrophobic silica particles (8) are obtained.

In the irregular-shaped silica particles (8), the volume average particle size is 80 nm, the average circularity degree [100/SF2] is 0.83, and the average value of Da/H is 1.38.

Comparative Example 3

By setting the time from the start of the simultaneous dripping of the tetramethoxysilane and the 3.7% ammonia water to the stop thereof to 0.24 minutes, by setting the addition amount of the tetramethoxysilane at that time to 0.0010 mol/mol with respect to the alcohol added in the preparing process, by setting the time from the stop of the dripping to the restart of the dripping to 0.3 minutes, and by setting the other conditions to be the same as in the manufacturing of the irregular-shaped silica particles (1) in Example 1, irregular-shaped hydrophobic silica particles (9) are obtained.

In the irregular-shaped silica particles (9), the volume average particle size is 180 nm, the average circularity degree [100/SF2] is 0.8, and the average value of Da/H is 1.3.

Comparative Example 4

By setting the time from the start of the simultaneous dripping of the tetramethoxysilane and the 3.7% ammonia water to the stop thereof to 2.2 minutes, by setting the addition amount of the tetramethoxysilane at that time to 0.0093 mol/mol with respect to the alcohol added in the preparing process, by setting the time from the stop of the dripping to the restart of the dripping to 0.3 minutes, and by setting the other conditions to be the same as in the manufacturing of the irregular-shaped silica particles (1) in Example 1, irregular-shaped hydrophobic silica particles (10) are obtained.

In the irregular-shaped silica particles (10), the volume average particle size is 160 nm, the average circularity degree [100/SF2] is 0.78, and the average value of Da/H is 1.35.

Comparative Example 5

In order to manufacture the silica particles, when the time from the start of the simultaneous dripping of the tetramethoxysilane and the 3.7% ammonia water to the stop thereof is set to 1 minutes, the addition amount of the tetramethoxysilane at that time is set to 0.0042 mol/mol with respect to the alcohol added in the preparing process, the time from the stop of the dripping to the restart of the dripping is set to 12 minutes, and the other conditions are set to be the same as in the manufacturing of the irregular-shaped silica particles (1) in Example 1, gelation is generated during the manufacturing, and thus, the silica particles cannot be obtained.

Comparative Example 6

By setting the other conditions to be the same as in the manufacturing of the irregular shaped silica particles (1) in Example 1, except that the maturing process of the temporary stop after the simultaneous dripping of the tetramethoxysilane and the 3.7% ammonia water is not provided, irregular-shaped hydrophobic silica particles (11) are obtained.

In the irregular-shaped silica particles (11), the volume average particle size is 150 nm, the average circularity degree [100/SF2] is 0.8, and the average value of Da/H is 1.28.

Comparative Example 7

By setting the total addition amount of the tetramethoxysilane to 200 parts, by setting the time from the start of the simultaneous dripping of the tetramethoxysilane and the 3.7% ammonia water to the stop thereof to 0.2 minutes, by setting the addition amount of the tetramethoxysilane at that time to 0.0008 mol/mol with respect to the alcohol added in the preparing process, and by setting the other conditions to be the same as in the manufacturing of the irregular-shaped silica particles (1) in Example 1, irregular-shaped hydrophobic silica particles (12) are obtained.

In the irregular-shaped silica particles (12), the volume average particle size is 400 nm, the average circularity degree [100/SF2] is 0.87, and the average value of Da/H is 1.35.

Comparative Example 8

By setting the total addition amount of the tetramethoxysilane to 120 parts, by setting the time from the start of the simultaneous dripping of the tetramethoxysilane and the 3.7% ammonia water to the restart of the dripping through the drip nozzle for the predetermined time and the simultaneous stop thereof to 11 minutes, by setting the addition amount of the tetramethoxysilane at that time to 0.0063 mol/mol with respect to the alcohol added in the preparing process, and by setting the other conditions to be the same as in the manufacturing of the irregular-shaped silica particles (1) in Example 1, irregular-shaped hydrophobic silica particles (13) are obtained.

In the irregular-shaped silica particles (13), the volume average particle size is 250 nm, the average circularity degree [100/SF2] is 0.84, and the average value of Da/H is 2.

size of the same level as in Example 1, and the irregular-shaped silica particles (10) that are not flat hardly maintain the flowability.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Silica particles having a volume average particle size of from about 100 nm to about 500 nm, an average circularity degree of from about 0.5 to about 0.85, and an average value of the ratios of circle equivalent diameters Da of the silica particles obtained by a flat image analysis to maximum heights H of the silica particles obtained by a stereoscopic image analysis of more than 1.5 and less than 1.9.

2. The silica particles according to claim 1, wherein surfaces thereof are hydrophobized by a hydrophobizing agent.

3. The silica particles according to claim 2, wherein the hydrophobizing agent is a known organic silicon compound having an alkyl group.

TABLE 1

|  | First Supply process | | Maturing Process | Total TMOS addition in first and second supply processes Mass [parts] | Characteristics | | | | |
|---|---|---|---|---|---|---|---|---|---|
|  | Supply time | TMOS amount in supply stop [mol/mol] (to methanol) | Supply stopping time (min) |  | Irregular-shaped silica particle No. | Volume average particle size [nm] | Average circularity degree [100/SF2] | Average value of Da/H | Evaluation Flowability maintenance |
| Example 1 | 1.5 | 0.0063 | 1 | 90 | 1 | 170 | 0.73 | 1.72 | A |
| Example 2 | 0.6 | 0.0025 | 1 | 90 | 2 | 120 | 0.82 | 1.55 | C |
| Example 3 | 1.8 | 0.0076 | 1 | 90 | 3 | 300 | 0.83 | 1.7 | B |
| Example 4 | 1.5 | 0.0063 | 0.6 | 90 | 4 | 180 | 0.83 | 1.6 | B |
| Example 5 | 1.5 | 0.0063 | 9.5 | 90 | 5 | 250 | 0.55 | 1.8 | A |
| Example 6 | 1.5 | 0.0063 | 6 | 250 | 6 | 450 | 0.8 | 1.6 | C |
| Comparative example 1 | 0.2 | 0.0008 | 0.3 | 350 | 7 | 600 | 0.8 | 1.4 | D |
| Comparative example 2 | 0.3 | 0.0013 | 0.3 | 40 | 8 | 80 | 0.83 | 1.38 | D |
| Comparative example 3 | 0.24 | 0.0010 | 0.3 | 90 | 9 | 180 | 0.8 | 1.3 | D |
| Comparative example 4 | 2.2 | 0.0093 | 0.3 | 90 | 10 | 160 | 0.78 | 1.35 | D |
| Comparative example 5 | 1 | 0.0042 | 12 | 90 | gel shape | — | — | — | — |
| Comparative example 6 | 1.5 | 0.0063 | 0 | 90 | 11 | 150 | 0.8 | 1.28 | D |
| Comparative example 7 | 0.2 | 0.0008 | 1 | 200 | 12 | 400 | 0.87 | 1.35 | D |
| Comparative example 8 | 1.5 | 0.0063 | 11 | 120 | 13 | 250 | 0.84 | 2 | D |

As understood from Table 1, the irregular-shaped silica particles in the examples are excellent in performance of maintaining the flowability of the resin particles, compared with the irregular-shaped silica particles in the comparative examples.

For example, as understood from comparison of the irregular-shaped silica particles (1) in Example 1 and the irregular-shaped silica particles (10) in Comparative example 4, Da/H is small even in the irregular-shaped particles of the particle 4. The silica particles according to claim 3, wherein the hydrophobizing agent is hexamethyldisilazane.

5. The silica particles according to claim 2, wherein the amount of the hydrophobizing agent is from about 1 mass % to about 100 mass % with respect to the silica particles.

6. A method of manufacturing the silica particles according to claim 1, the method comprising:
preparing an alkali catalyst solution in which an alkali catalyst is included in a solvent that contains alcohol;

supplying, until the supply amount of tetraalkoxysilane reaches from about 0.002 mol/mol to about 0.008 mol/mol with respect to the amount of the alcohol in the preparation of the alkali catalyst solution, the tetraalkoxysilane and the alkali catalyst to the alkali catalyst solution;

stopping the supply of the tetraalkoxysilane and the alkali catalyst for a period of time of from about 0.5 min to about 10 min after the supply of the tetraalkoxysilane and the alkali catalyst; and supplying the tetraalkoxysilane and the alkali catalyst to the alkali catalyst solution after the supply stop.

7. The method according to claim 6, wherein the alkali catalyst is ammonia.

8. The method according to claim 6, wherein the concentration of the alkali catalyst is from about 0.6 mol/L to about 0.85 mol/L.

9. The method according to claim 6, wherein the tetraalkoxysilane includes at least one of tetramethoxysilane and tetraethoxysilane.

10. Resin particles having surfaces to which the silica particles according to claim 1 are attached.

11. Resin particles having surfaces to which the silica particles according to claim 1, having surfaces hydrophobized by a hydrophobizing agent, are attached.

* * * * *